United States Patent Office 3,667,927
Patented June 6, 1972

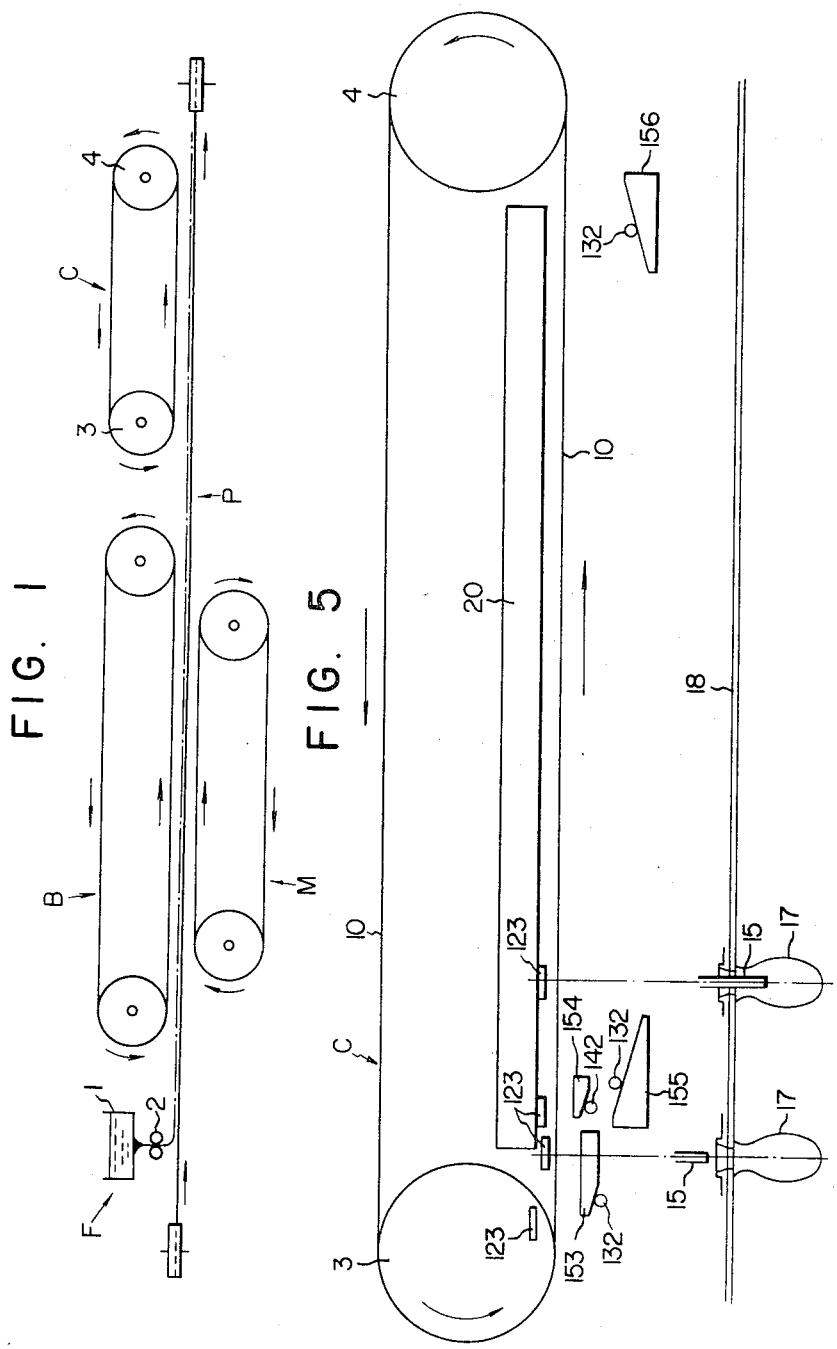

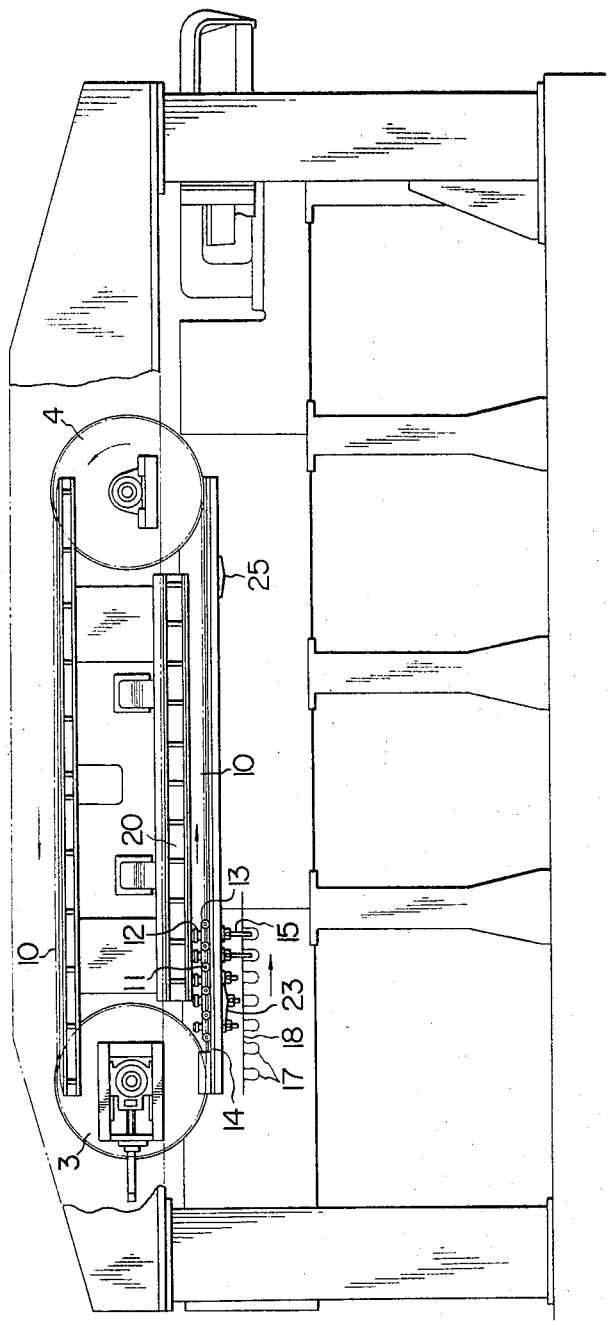

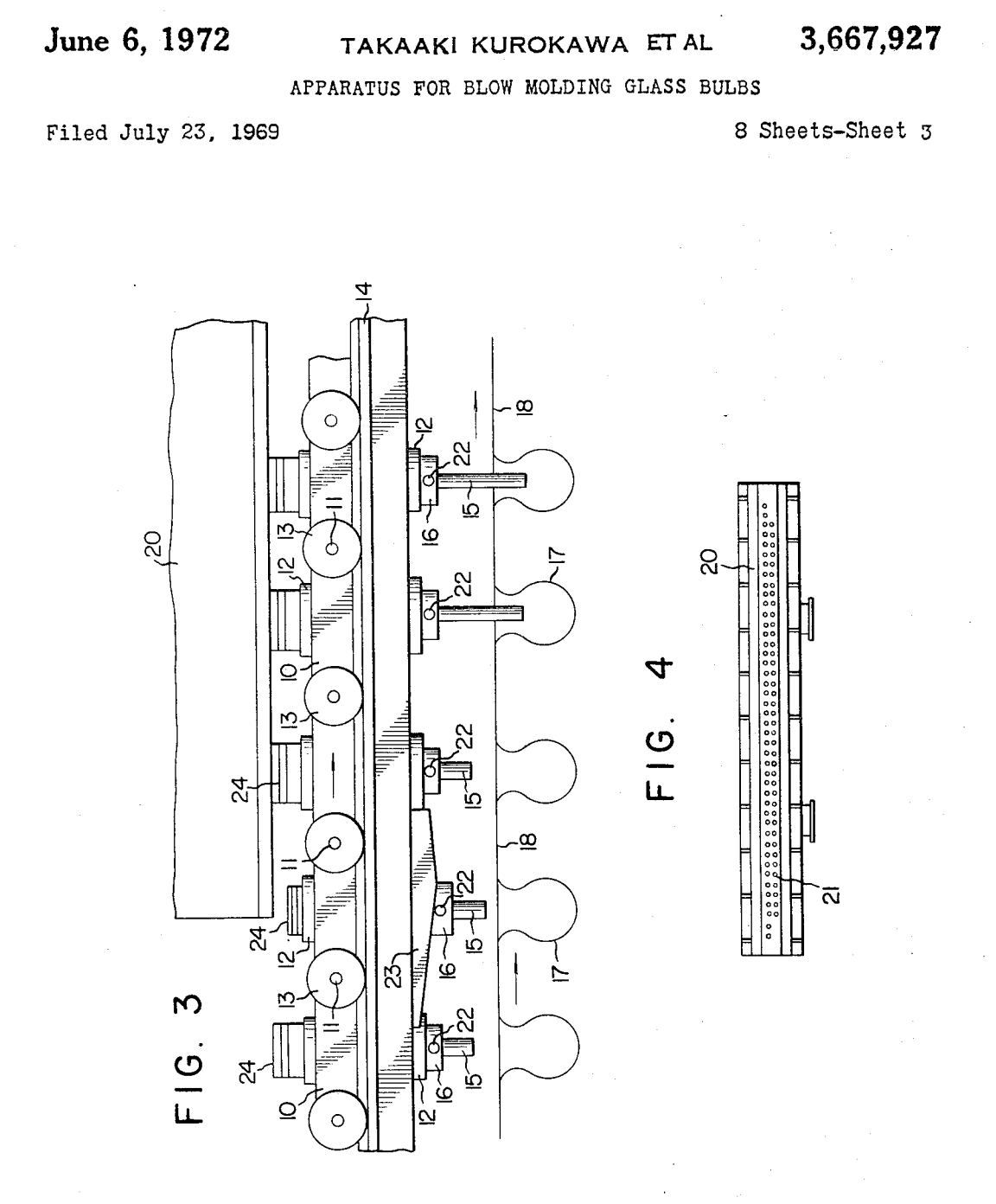

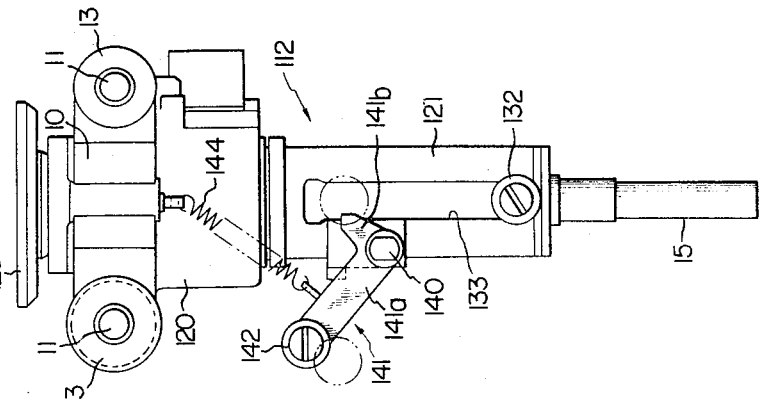
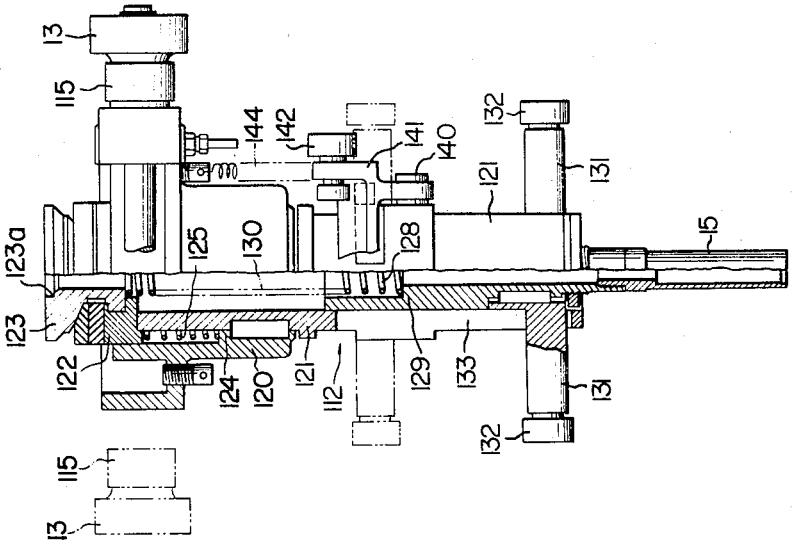

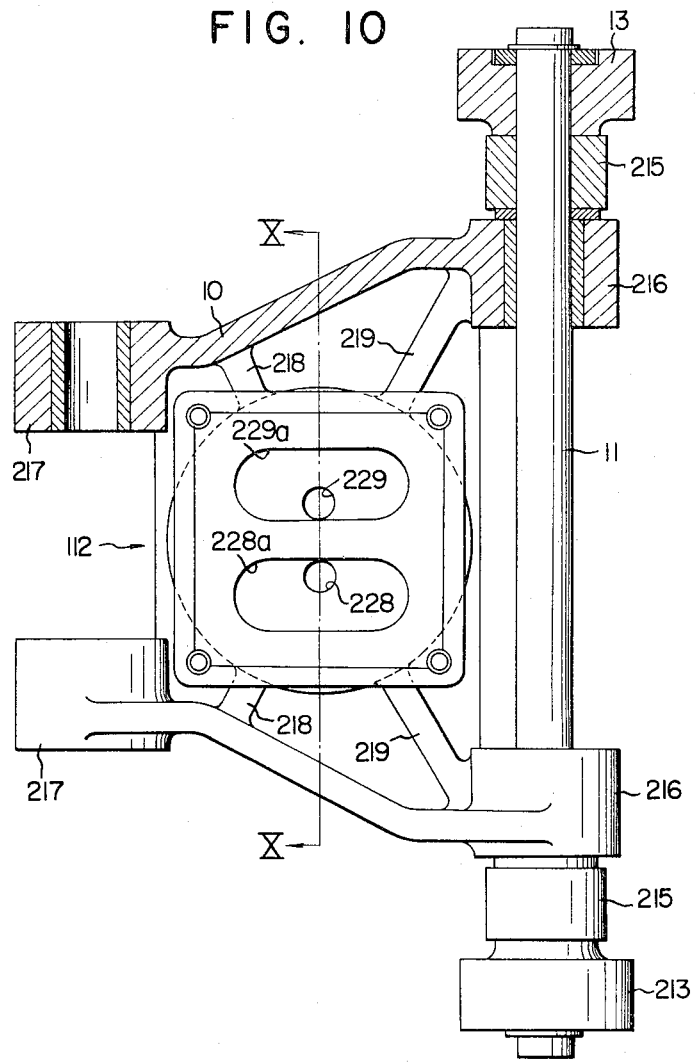

3,667,927
APPARATUS FOR BLOW MOLDING GLASS BULBS
Takaaki Kurokawa, Chigasaki-shi, Junji Yamada, Odawara-shi, and Makoto Wada, Kawasaki-shi, Japan, assignors to Tokyo Shibaura Denki Kabushiki Kaisha, Kawasaki-shi, Japan
Filed July 23, 1969, Ser. No. 843,991
Claims priority, application Japan, July 31, 1968, 43/54,077, 43/54,079, 43/54,080
Int. Cl. C03b 9/12
U.S. Cl. 65—185     13 Claims

ABSTRACT OF THE DISCLOSURE

An improved apparatus for blowing molding glass bulbs comprising a plate link for conveyor feeding a ribbon of semifused glass, a blow head link conveyor disposed on one side of a running surface of the plate link conveyor and adapted to support a series of blow heads moved in synchronism with the plate links and in the same direction therewith, and a mold link conveyor disposed on the other side of the running surface of the plate link conveyor and adapted to support a series of molds moved in synchronism with the blow heads and in the same direction therewith, said apparatus being provided with pressurizer apparatus for which this invention provides improved blow heads having air blast pipes adapted to blow air into formed bulbs and fed in synchronism with the bulbs and in the same direction as the feed passage of the glass ribbon having bulbs blow-molded between the blow head links and the mold links. Furthermore, there is described herein a structure of the pressurizer heads with improved operating mechanism.

BACKGROUND OF THE INVENTION

This invention relates generally to apparatus, known as ribbon machines, for blow molding glass such as electric lamps bulbs. More specifically, the invention relates to a ribon machine provided with pressurized means for blow molding glass bulbs by blowing air into glass bulbs and thereafter effecting such operations as forced cooling and cleaning of the bulbs, and coloring of the internal surfaces thereof.

As illustrated in FIG. 1, a conventional apparatus for blow molding glass bulbs comprises a blow head link conveyor B, a plate link conveyor P run therebelow, a mold link conveyor M disposed further therebelow, and ribbon glass supply means F which includes a glass fusing furnace 1 and a pair of rollers 2 adapted to feed fused glass supplied therefrom in the shape of a ribbon. A ribbon of semifused glass which has passed through the feed rollers 2 is led onto the plate link conveyor P (which is endless and circled in a horizontal plane) moving in the arrow marked direction and then fed in the rightward direction as viewed in the drawing.

The blow head link conveyor B supports on the periphery thereof a number of blow heads disposed at equal intervals in the longitudinal direction. An air blast tip provided for each blow head is disposed opposed to the ribbon glass on the plate link conveyor P when the blow head is moved to a position in the lower running portion of the conveyor B. The blow heads are run in synchronism with the plate link P in the arrow marked direction.

The mold link conveyor M supports on the periphery thereof a number of molds disposed at equal intervals in the longitudinal direction. A molding cavity provided for each mold is directed upward and opposed to a plate link P when the mold is moved to a position in the upper running portion of the link B. The molds of the mold link conveyor M are moved in the arrow direction in opposition to and in synchronism with the blow head links B.

When the ribbon of semifused glass on the plate link conveyor P arrives at a position between the blow head links B and mold links M, the air blast tips of the blow heads of the blow head links B are lowered onto the surface of the ribbon of glass and blow air thereagainst, thereby deforming the air-blown portion of the glass ribbon toward the inside walls of the cavities of the molds of the mold link conveyor M run in opposition thereto, and into the shape of a bulb. The blast tips are further lowered into the interiors of the bag-like portions or parisons of the glass expanded downwardly into the shape of bulbs and form glass bulbs corresponding in shape to the inside walls of the cavities of the molds.

The blast tips of the blow heads are pulled upwardly to retract from the blast cavities immediately before the position where the link conveyor B is reversed, while the molds are released to make possible the escapement of the molded glass bulbs immediately before the position where the link conveyor M is reversed.

In the above described conventional apparatus for blow molding glass bulbs, the molded glass bulbs are fed forward while being suspended from the ribbon of glass, and they are cooled naturally until they are separated from the glass ribbon by means of a knife provided at a rearward part of the apparatus.

Accordingly, a certain extent both in distance and time must be provided until the bulbs are cut off from the ribbon by means of a knife after the bulbs have been formed on the ribbon. The result has been excessive length required for the whole apparatus, which thus inevitably occupies a considerable space in a plant. When such a distance is insufficient, glass bulbs are dropped into a distributor by being cut with a knife when not cooled to a sufficient degree, so that such bulbs are either deformed or defective in their outside surfaces, whereby there has been a great tendency for production of inferior goods. Further, when foreign objects such as fragments of glass and casting fins are contained in the interior of a bulb, they cannot be extracted as they adhere to the inner surface of the bulb due to the high temperature thereof.

SUMMARY OF THE INVENTION

It is accordingly a principal object of the present invention to provide an improved apparatus for use in a machine for blow molding glass bulbs whose length as a whole can be shortened, and by which fragments of glass and the like in the interiors of bulbs can be blown out for removal, and, moreover, bulbs can be colored as desired without the accompaniment of the above described drawbacks attendant to the conventional apparatus.

Another object of the invention is to provide an apparatus capable of blow molding glass in a semifused state into electric lamps by means of a blow head link conveyor and mold link conveyor and rapidly cooling the electric lamps so molded by forcefully blowing compressed air therein by means of blast heads of the pressurizer means of this invention.

Still another object of the invention is to provide an apparatus wherein the blast heads of the pressurizer means adapted to effect the rapid cooling of electric lamps are operated both effectively and appropriately by making adept use of compressed air.

According to the present invention, these and other objects have been attained by providing an apparatus for blow molding glass bulbs with pressurizer means having blast heads equipped with blast pipes for blowing air into bulbs and fed in synchronism with the bulbs along a glass ribbon feed passage in the same direction therewith while said feed passage has bulbs which have been blow molded between a blow head link conveyor and mold link conveyor of the apparatus for blow molding glass bulbs comprising a plate link conveyor for feeding a ribbon of semifused glass, the mentioned blow head link conveyor being disposed on one side of a running surface of the plate link conveyor and adapted to support a series of blow heads moved synchronously and in the same direction with the plate link conveyor and the mentioned mold link conveyor disposed on the other side of the running surface of the plate link conveyor and adapted to support a series of molds moved synchronously and in the same direction with the blow heads.

The nature and characteristic features of the present invention will now be described in detail in conjunction with the attached drawings, in which the same and equivalent members are designated by the same reference numerals and characters.

BRIEF DESCRIPTION OF THE DRAWINGS

FIG. 1 is a diagrammatic side elevation showing the essential components of an apparatus which is partly conventional and partly according to the present invention and indicating the principle thereof;

FIG. 2 is a side elevational view showing further details of pressurizer means of the apparatus shown in FIG. 1;

FIG. 3 is a side elevational view showing enlarged essential details of FIG. 2;

FIG. 4 is a plan view of an air tank;

FIG. 5 is a diagrammatic side elevation of the pressurizer means of this invention;

FIG. 8 is a front view of the head shown in FIG. 7;

FIG. 9 is a partially cut away side elevational view of FIG. 8 as seen from the left hand side thereof;

FIG. 10 is a plan of a pressurizer head of this invention with part thereof shown in longitudinal section;

DETAILED DESCRIPTION OF THE INVENTION

Figure 6:
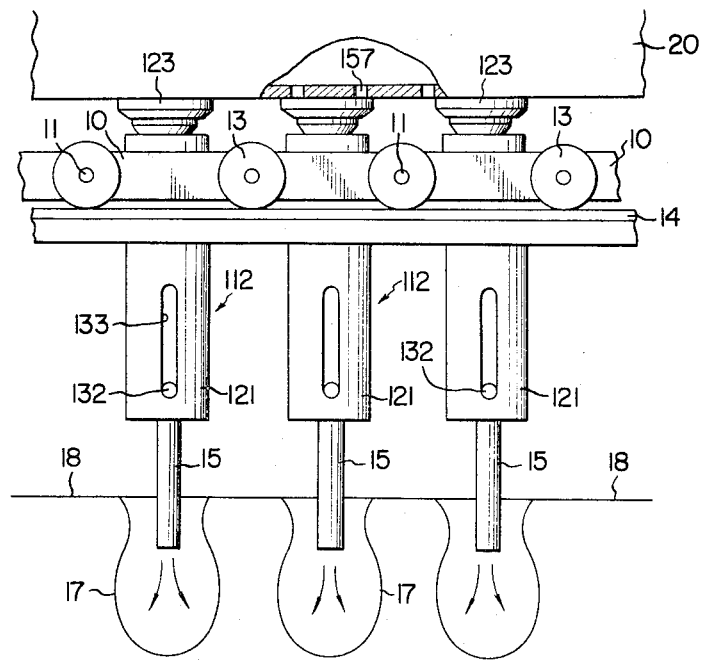
FIG. 6 is an enlarged fragmentary side elevation showing part of FIG. 5 in more detail.

In FIG. 1 the pressurizer means characteristic of this invention is designated by the reference character C. This means C is provided at the back of the blow head link conveyor B already described and, like the link conveyor B is positioned above the plate link conveyor P. Fundamentally, the means C consists of an endless link conveyor driven in the direction shown by an arrow by means of sprockets 3 and 4, similarly as the link conveyor B.

The above pressurizer means C is driven in synchronism with the links B, M and P described above. For instance, the means C can be driven by connecting a shaft of the sprocket 4 to a drive shaft of the plate link P through suitable transmission means. Desirably, the fine adjustment of the phase differences of the pressurizer means C with respect to the plate link P should be insured by the interposition of an adjustable joint (not shown) on the input side of the drive shaft of the sprocket 4.

In FIG. 2, in which the pressurizer means C is illustrated in greater detail the reference numerals 3 and 4 designate sprockets corresponding to the sprockets 3 and 4 shown in FIG. 1. An endless pressurizer link conveyor 10 is extended between these sprockets 3 and 4, which are thus driven in the arrow direction in the drawing. As shown in FIGS. 2 and 3, links 10 are pivoted by adjoining links 10 and pins 11 and support cooling air blast heads 12 integrally therewith. Secured at both ends of the pivoting pins of the links are guide rollers 13, which roll on guide rails 14.

The air blast head 12 comprises as still to be described, of a shell, a sleeve or cylinder capable of vertical movement within the shell and energized upwardly by means of a spring, a piston capable of vertical reciprocation within the sleeve, and an air blast pipe integral with the piston. The air blast pipe protrudes downward from the lower end of the blast head 12, as shown by reference numeral 15 in FIG. 3. A part of the sleeve is designated by numeral 16 in FIG. 3. The air blast heads 12 travel in the arrow direction above a ribbon of glass 18 from which molded bulbs 17 (refer to FIG. 3) are suspended, the air blast pipes 15 of the heads 12 being located right above the bulbs 17 to be moved at the same speed therewith.

As illustrated in FIG. 2, an air tank 20 is secured along and above the lower running portion of the pressurizer link conveyor. The air tank 20 has a number of holes 21 perforated in the bottom thereof for the supplying pressurized, air as shown in FIG. 4.

As shown in FIGS. 2 and 3, the sleeves 16 of the blast heads 12 are lowered to prevent interference thereof with an end of the air tank 20 immediately before they reach the lower surface of the air tank. That is, rollers 22 as shown in FIG. 3 are provided at the lower ends of the sleeves 16, the rollers 22 being gradually guided downwardly by an inclined surface of the guide cam 23 provided below the rails 14 slightly before the blast heads 12 arrive at the air tank 20, so that the sleeves 16 supporting the rollers 22 are pulled down in the shells of the blast heads 12 despite upward-orientated elastic force. Thus, an air tank engaging shoe 24 secured at the upper end of the sleeve 16 is pulled down, preventing collision with the air tank 20.

When the blast heads 12 arrive below the air tank 20, the sleeves 16 are gradually released from a downward restrictive force which has been applied thereto by the inversely inclined surface of the cam 23, until the shoes 24 of the sleeves 16 elastically contact the lower surface of the air tank 20 due to the upward-orientated elastic force applied to the sleeves 16.

When the holes 21 of the lower surface of the air tank 20 come into coincidence with the openings formed in the shoes 24 by the advance of the blast heads 12, the pressurized air in the air tank 20 is introduced into the sleeves 16 of the blast heads 12 through the holes 21 and the openings of the shoes 24. Thus downward force is applied to the tops of pistons, still to be described, in the interiors of the sleeves 16, lowering the air blast pipes 15 integral with the pistons. Since the blast heads 12 and molded bulbs 17 are fed in synchronism with each other, the blast pipes 15 are inserted into the interiors of corresponding bulbs 17. In this instance, if provision is made to feed a part of the pressurized air into the blast pipes 15, the interiors of the bulbs 17 will be cooled by the drafts emitted from the tips of the blast pipes 15 and fragments of glass therein will be blown off. Furthermore, the inside surfaces of the bulbs 17 can be colored if the air blown therein is previously mixed with a coloring agent.

When the blast heads 12 are advanced to the neighborhood of the end of the air tank 20, the sleeves 16 are lowered again by the cam 25 (refer to FIG. 2) so that the supply of pressurized air from the air tank 20 to the heads 12 is stopped, with the result that the pistons within the heads 12 are elevated by springs and the like, and the air blast pipes are pulled upwardly from within the bulbs 17. Thus, the completely cooled, cleaned or colored bulbs 17 are fed backward together with the ribbon 18 thereof to be separated from the ribbon by a knife.

The holes 21 for supply of air into the blast heads 12 are arranged in two rows by way of example in FIG. 4, the holes in one row being air supply holes for the insertion of the air blast pipes 15 into the bulbs 17 by depressing the pistons, while the holes in the other row are for feeding air into the air blast pipes 15.

The blast heads 12, after the completion of the blasting operation are returned to their initial positions in an overturned state by deviating from the feed path of the bulbs 17, e.g., the path of the plate link conveyor P, since the link conveyor 10 is turned upwardly at the sprocket 4.

Figure 7:
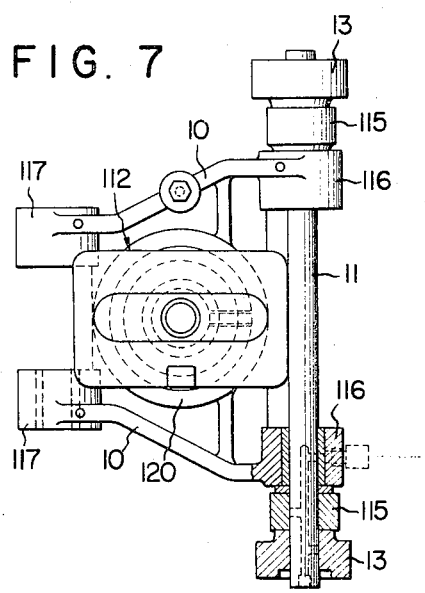
FIG. 7 is a plan view of an air blast head for use in the pressurizer means of this invention.

A more detailed structure of the link 10 is illustrated in FIGS. 7, 8 and 9.

In FIG. 7, showing a plan view of the link 10, the above described link pivoting pins are similarly represented by the numeral 11 while guide rollers at both ends of the pins 11 are likewise designated by the numeral 13. A roller 115 for a sprocket transmitting power for the running of the link is provided within the guide roller. Bearing portions 116 and 117 are provided at the two ends of the link 10, the bearing portion 116 being engaged around the pin 11. The interval between the bearing portions 117, 117 is made shorter than the interval between the bearing portions 116, 116. When a number of links 10 are pivotally coupled by pins 11, the bearing portions 116 and 117 of adjoining links are engaged around a common pin 11 in such a manner that the bearing portion 117 is located inside the bearing portion 116.

Between links 10, 10 positioned on both sides, an air blast head 12 is secured integrally with the links 10 by suitable means.

The blast head 12 is provided with a cylindrical shell 120, as shown especially in FIG. 9, the shell 120 being integral with the link 10. An outer sleeve 121 (functioning in the same way as the sleeve 16) is fitted in the shell 120 so as to be capable of vertical sliding. An air intake shoe 123 is secured at the upper end of the sleeve 121 through an annular member 122 extending in diametric direction. A compression spring 125 continually urging the outer sleeve 121 in an upward direction is disposed between the lower surface of the extending portion of the member 122 secured at the upper end of the outer sleeve 121 and the upper surface of an annular flange 124 projected from the inside surface of the shell 120.

An inner sleeve 128 having an air blast pipe 15 at its lower end is fitted in the outer sleeve 121 so as to be capable of vertical sliding. A compression spring 130 is disposed between a stepped portion 129 of the inner sleeve 128 and the lower surface of the shoe 123, so that the inner sleeve 128 is always resiliently pressed down. Protruding transversely and adjacent of the lower end of the inner sleeve 128 are a pair of arms 131, at whose leading ends cam rollers 132 are supported. The arms 131 extend passed through guide slots 133 formed longitudinally in the outer sleeve 121. Thus the inner sleeve 128 is capable of vertical movement within the outer sleeve 121 while the arms 131 thereof are guided in the slots 133.

A pivoting pin 140 (refer to FIGS. 8 and 9) secured to the periphery of approximately the centerpart of the outer sleeve 121 pivotally support an L-shaped latch lever 141 at its bent part. A follower roller 142 is fixed to a free end of one arm 141a of the latch lever 141, and, further, a contractible tension spring 144 is extended between the middle portion of the arm 141a and the link 10, urging the latch lever 141 continually in the clockwise direction in FIG. 8. The free end of the other arm 141b of the latch lever 141 functions as a latch by being engaged with or disengaged from one of the arms 131 guided in vertical direction in the slots 133 of the outer sleeve.

When the arm 131 and roller 132 are positioned in the vicinity of the uppermost portion of the slots 133, the leading end of the arm 141b of the latch lever 141 is located lower than the arm 131, and the arm 141b, continually urged in the clockwise direction by the spring 144, contacts the lower surface of the arm 131, thereby preventing it from being pulled down by the force of the spring 130. However, when the follower roller 142 is pressed down, the arm 141b is turned in the counterclockwise direction and disengaged from the arm 131 after slightly elevating the arm 131. Thus the arm 131 and roller 132 are made capable of downward movement, while being guided by the slot 133 by the force of the spring 130.

As shown in FIG. 5, an air tank 20 is disposed along the lower running course of the link 10 between the sprockets 3 and 4 of the pressurizer means. The bottom of this air tank 20 is situated slightly above the lower running course of the link conveyor 10 and is perforated with a number of air blast holes 157 (functioning in the same way as the pressurized air supply openings 21) aligned in the longitudinal direction of the running course (refer to FIG. 6).

A ribbon of glass, from which molded bulbs 17 are suspended, runs below the lower running course of the link 10 and in parallel therewith. The blow heads 12 turned around the periphery of the sprocket 3 and advanced to the lower running course of the link conveyor 10 are in exact alignment with the bulbs 17 suspended from the ribbon 18 running therebelow in their vertically spaced positions and are fed forward in that state.

The roller 132 supported by the inner sleeve 128 of the blow head 12 fed to the lower running course around the sprocket 3 is at first held at the uppermost position of the slot 133 by means of the latch lever 141, so that the blast pipe 15 is at a retracted (elevated) position.

A cam 153 is provided immediately before the blow head 12 arrives at the foremost part of the air tank 20 (refer to FIG. 5). As is seen in FIG. 5, a lower cam surface at a front part of the cam 153 has an inclination gradually lowered in the right hand direction. Therefore, when the cam 153 starts guiding, the roller 132 is gradually pulled downward. In this instance, the arm 31 of the roller 132 is prevented from descending by the latch arm 141b of the latch lever 141, so that the outer sleeve 121 is also lowered together with the lowering of the roller 132. Thus the air intake shoe 123 secured at an upper end of the outer sleeve 121 is also lowered. Consequently, even when the blow head 12 arrives at a position at the leading end surface of the air tank 20, the upper surface of the shoe 123 is situated lower than the bottom of the tank 20 so that no collosion is caused between the shoe 123 and the tank 20.

In sucession to the cam 153, upper and lower cams 154 and 155 are provided. The upper cam 154 is adapted to act on the mentioned subordinate roller 142, gradually pressing the roller 142 downwardly. Thus, in FIG. 8, the latch lever 141 is turned in the counterclockwise direction, and the arm 141b of the lever 141 slightly lifts the arm 131 of the roller 132 and is thereafter disengaged therefrom. As a result, the roller 132 and the arm 131 thereof are unlatched, and the inner sleeve 128 is lowered by the operation of the compression spring 130. However, the roller 132 is prevented from descending by the cam surface of the cam 155 below the cam 154. When the roller 132 is advanced in the right hand direction in FIG. 5 along with the advance of the blow head 12, the roller 132 is permitted to descend gradually by the cam 155, so that the inner sleeve 128 supporting it is also lowered. Thus the blast pipe 15 is also gradually lowered to be inserted into a bulb 17 of the glass ribbon 18 travelling therebelow.

On the other hand, when the air intake shoe 123 at the upper end of the blow head 12 reaches the first of the air exhaust holes 157 of the bottom of the air tank 20 by the advance of the blow head 12, the air within the tank 20 is charged into the openings of the outer and inner cylinders 121 and 128 through the opening of the shoe 123 and then blown into the bulb 17 through the blast pipe 15. By the provision of a depression 123a elongated in a direction of feeding at the upper end of the opening of the shoe 123 (refer to FIG. 9), the opening of the shoe 123 is always communicated with either one of the air supply holes of the tank 20 so that the supply of air is maintained ceaselessly.

The shoe 123 is thereafter advanced while being pressed against the bottom of the air tank 20, by the operation of the spring 125, in a condition as illustrated in FIG. 5.

When it reaches the neighborhood of the tank 20, the roller 132 of the blow head 12 is moved upward by the upwardly slanted cam surface of the cam 156, so that the arm 131 is elevated within the elongated hole 133 until it pushes aside the latch arm 141*b* of the latch lever 141 and reaches thereabove to be latched by the arm 141*b*. Thus the air blast pipe 15 escapes from the bulb 17 and is fed to the initial position through the sprocket 4 in a state of retraction into the head 12.

Figure 11:
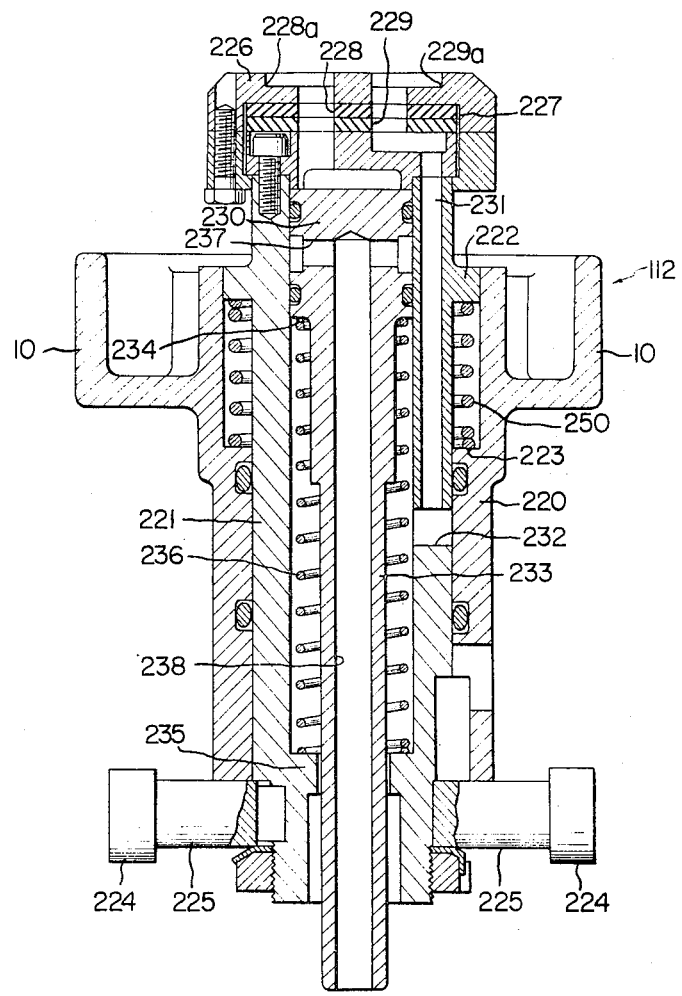
FIG. 11 is a longitudinal section of the head shown in FIG. 10 taken along the plane of line X—X therein.

The structure of another blow head 12 of the link 10 is illustrated in detail in FIGS. 10 and 11. In FIG. 10, showing a top view of the link 10, the link pivoting pin is designated by the same reference numeral 11, while guide rollers at both ends of the pin 11 are also represented by the same numeral 13. A roller 215 for a sprocket transmitting power for the running of the link conveyor is provided inside of the guide roller 13. A pair of bearing portions 216 and 217 are provided at the ends of the link 10, the bearing portion 216 being fitted around the pin 11. The distance between the bearing portions 217, 217 is made shorter than the distance between the bearing portions 216, 216 bearing portions 217, 217 being inserted between bearing portions 216, 216 of an adjoining link 10 on a left hand side in FIG. 10, and being coupled with a common pin 11 to the outer bearing portions 216, 216.

The above air blow head 12 is secured between the links 10, 10 at both sides by means of coupling members 218 and 219 or the like.

The air blow head 112 is provided with a structure as shown in FIG. 11. That is, in the same drawing, the reference numeral 220 designates a shell of the head 112 which is integral with the link 10. The shell 220 is in the shape of a cylinder, containing a cylinder 221 fitted so as to be capable of slidingly moving in the vertical directions. A flange 222 projects outward on the upper end side of the periphery of the cylinder 221, while a compression spring 250 is interposed between the flange 222 and a shoulder portion 223 provided on the shell 220. A pair of follower rollers 224 project outward in the vicinity of the bottom end of the cylinder 221. A shaft 225 supporting each of these rollers is abutted against the lower end of the shell 220 in order to limit the elevation of the cylinder 221 urged upward by the spring 250.

An air receiver shoe 226 is secured to the upper end of the cylinder 221. The lower surface of the shoe 226 is supported by a rubber plate 227. Two air receiver holes 228 and 229 are formed in the shoe 226, the hole 228 reaching a cylinder space above the piston 230 moved slidingly in the cylinder 221, and the hole 229 communicates with a passage 231 formed longitudinally in the wall of the cylinder 221. The passage 231 communicates with a space within the cylinder 221 through a transverse hole 232. In the upper surface of the shoe 226, depressions 228*a* elongated in the direction of the travel of the blow head 212 are formed so as to surround the air receiver holes 228 and 229.

The piston 230 is provided with an air blast pipe 233 extending downward integrally therewith and projecting further downward after penetrating the lower opening of the cylinder 221. Provided between a graded portion 234 of the piston 230 and an inner shoulder portion 235 near the bottom end of the cylinder 221 is a compression spring 236 continually urging the pitson 230 toward its upper terminal position. A hole 237 penetrating transversely is provided in the vicinity of the top of the pitson 230, and, further, an air blast passage 238 is provided which is opened after penetrating the air blast pipe 233 downwardly from said hole 237.

As illustrated in FIGS. 2 and 3, the air blow head 12 is fed in the right hand direction in synchronism with a glass ribbon 18 from which molded glass bulbs 17 are suspended, while being supported by the link conveyor 10 and directing the opening of the air blast pipe 223 (the same as the blast pipe 15) in the downward direction. During this operation the blow pipe 233 and bulb 17 are in exact alignment with each other in their vertically spaced positions.

Also as shown in FIGS. 2 and 3, an air tank 20 is secured along but higher than the lower running portion of the pressurizer link conveyor 10. The air tank 20 has a number of pressurized air supply holes 21 perforated in its botom, as shown in FIG. 4. These holes are aligned in rows by way of example in FIG. 4.

Again as shown in FIGS. 2 and 3, the cylinders 221 within the blow heads 12 of the pressurizer link conveyor 10 are lowered immediately before they reach the bottom surface of the air tank 20 in order to void collision therewith. For this lowering, a guide cam 23 is secured along the lower surface of the rails 14. The guide cam 23 operates cooperatively with the follower roller 224. When the roller 224 of the blow head 12 in motion is guided by a guide surface where the cam 23 is lowered gradually, the cylinder 221 is also lowered against the force of the spring 250 shell 220 along with the lowering of the roller 224. Consequently, the air receiver shoe 226 at the top of the cylinder 221 is lowered, thus preventing collision between the shoe 226 and air tank 20 at the lower surface of the air tank 20.

When the blow head 12 is advanced completely to the lower surface of the air tank 20, the force which has been pressing the cylinder 221 downwardly is gradually released by the upward slanted surface of the guide cam 25, so that the cylinder 221 is elevated by the force of recovery of the compression spring 250 until the air receiver shoe 226 at the upper end of the cylinder 221 elastically contacts the lower surface of the air tank 20. During this operation, airtight contact between the bottom surface of the air tank 20 and the upper surface of the shoe 226 is insured by the elasticity of the rubber plate 227.

Of the air supply holes 21 aligned in two rows at the bottom of the air tank 20, the first hole in a row on the side of the air receiver hole 228 is perforated at a more forwardly advanced position than the first hole in the other row. Thus, as the blow head 12 is advanced, the air receiver hole 228 of the shoe 226 first coincides with the first hole 21 in position, so that pressurized air in the air tank 20 is fed into a cylinder space above the piston 230 through the hole 228. Consequently, the piston 230 is pressed down against the force of the compression spring 236, with the result that the air blast pipe 233 integral therewith is also lowered and inserted into a bulb 17 of the ribbon 18.

When the blow head 12 is further advanced, the first hole 21 of the other row coincides in position with the air receiver hole 229 so that pressurized air is charged into the passage 231. In this instance, if a transverse hole 237 of the piston 230 communicates with a transverse hole 232 of the cylinder 221 by the lowering of the piston 230, the pressurized air in the passage 231 is fed through the transverse holes 232 and 237 to be injected into a bulb 17 through the passage 238. The receiver holes 228 and 229 always communicates with at least one hole 21 through the long depressions 228*a* and 229*a* at the upper ends of the receiver holes 228 and 229 even when the shoe 226 is advanced, so that the supply of air is not broken.

The injection of a draft of air into the bulb 17 forcefully cools the bulb 17, blowing off fragments of glass attached to the inside wall of the bulb 17. If a coloring agent and the like is previously mixed with the air to be blown into the bulbs, the inside surfaces of the bulbs can be colored or treated otherwise.

When the blow head 12 is advanced to the neighborhood of the end of the air tank 20, the cylinder 221 is again pulled down by another guide cam 25 (refer to FIG. 2) secured to the lower surface of the rails 14, so that the air receiver shoe 226 of the head 12 is separated from the bottom surface of the air tank 20. Therefore the supply of pressurized air into the air receiver holes 228 and 229 is cut off and the air blast pipe 233 is pulled up as the piston 230 is returned upward by the force of the spring 236, with the result that the supply of pressurized air into the air blast pipe 233 is suspended.

Thus, the ribbon 18 supporting the completely cooled, cleaned or colored bulbs 17 is fed in the rearward direction, and the bulbs are separated from the ribbon by a knife.

The blow head 12, after performing the blowing operation, is returned to the initial position in an overturned state, deviating from the feed paths of bulbs 17, that is, upward from the path of the plate link conveyor P, since the link conveyor 10 is turned upward at the sprocket 4.

Figure 12:
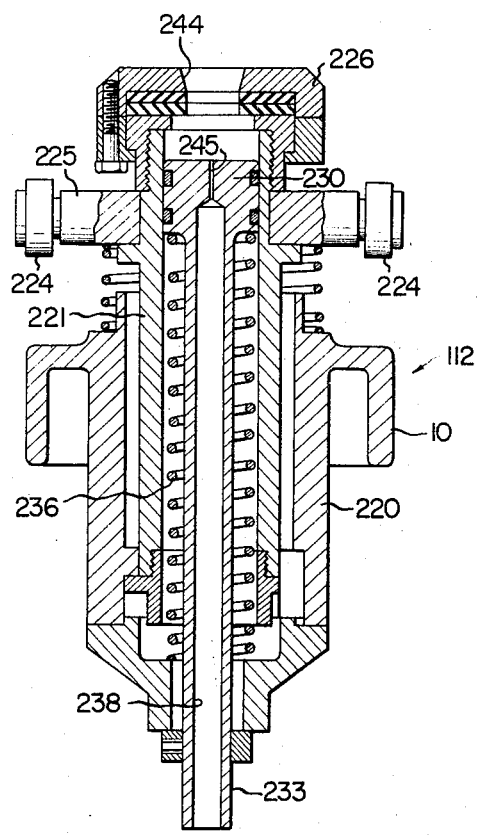
FIG. 12 is a longitudinal section, corresponding to FIG. 11, of a modification of the pressurizer head.

FIG. 12 illustrates another embodiment of the air blow head 12. Parts thereof corresponding to those of the head 12 shown mostly in FIG. 11 are designated by the same reference numerals. The primary features which differentiate the present head 12 from that illustrated in FIG. 11 are: (1) rollers 224 guided by guide cams 154 and 155 are provided at the upper portion of the piston 221 instead of a lower portion thereof; (2) an air receiver shoe 226 is provided with only one air receiver hole 244; and (3) a narrow passage 245 penetrating a piston 230 communicates with a passage 238 within an air blast pipe 233.

In actual use of this blow head 12, one row of air supply holes of the air tank 20 are sufficient.

The lowering of a shoe 226 due to the engagement between cams 154 and 155 is absolutely the same as that of the blow head 12 in the preceding example so that no further description thereof is given. In the example shown in FIG. 12, pressurized air is charged into a space above a piston 230 through the hole 244 to lower the piston when the shoe 226 coincides with the first hole 21 of the air tank 20 in position. Thus, the air blast pipe 233 is lowered into a bulb.

Simultaneouly with the start of the lowering of the piston 230, pressurized air is passed through the narrow passage 245 and fed in the passage 238 of the air blast pipe 233 to be blasted therefrom. During this operation, a part of the pressurized air is blown out from the passage 245, but pneumatic pressure still remains in the upper space of the piston 230 since the passage 245 is narrow, so that the piston 230 is continuously pressed down against the force of a spring 236. According to this example, a simpler structure is obtainable than that shown in FIG. 11.

As may be seen from the foregoing description of the present invention with respect to embodiment thereof, air is forcefully blown by means of pressurizer means bulbs 17 shaped by blow molding and fed while being suspended from a ribbon of glass, so that molded bulbs are cooled quickly. As compared with a conventional method of natural cooling, the length of the apparatus as a whole can be shortened. Moreover, flawless products are obtainable from which fragments of glass and the like are completely removed by the blasting of air. Furthermore, the internal surfaces of bulbs can be simultaneously reinforced or colored by blowing air therein according to this invention.

As described above, the forced cooling, cleaning and coloring of bulbs are made possible as air is forcefully blown into molded bulbs in this invention. In the pressurizer means of this invention performing these cooling and cleaning operations, an air intake portion, namely, an air intake shoe, of the blow head 12 to be slidingly contacted by that surface of the air tank in which air supply holes are perforated is temporarily displaced away from the air tank immediately before the air tank and thereafter brought into contact therewith, so that there is no possibility of collison of the air blow head with an edge of the air tank. Moreover, according to the present invention, the blast pipe 15 is first retracted into the blow head and then permitted to advance by releasing latch means at a specific position, so that safe as well as uniform blowing operation is insured. Furthermore, since the air blast pipe is advanced gradually, no violent impact due to a draft of blown air is imparted to the bulbs, and thus safe operation is effected.

What is claimed is:

1. In an apparatus for molding glass articles in part by gaseous pressure from a moving ribbon of plastic and thermally workable glass carried by an orifice plate link chain, the formed articles being suspended from the link chain at intervals therealong and in combination with said molding apparatus, a pressurizer means for effecting forced cooling of the formed articles and comprising an endless link-chain-connected series of blow heads operable to enter each article and blow air interiorly of the article in succession while travelling in synchronism with said ribbon, the improvement in said pressurizer means comprising an air blast pipe in each blow head and means in each blow head supporting said blast pipe for vertical sliding reciprocating movement, an air tank supplying air under pressure, on each blow head a shoe vertically shiftable on each respective blow head operable for connecting the air tank and air blast pipe, spring means connected with the shoe normally raising the shoe, each shoes having a single unit roller connected to said shoe and pipe, a cam engageable with each roller during certain travelling movement of the blow head sequentially lowering and raising the respective shoe, spring means in the blow head connected to the air blast pipe normally lowering said pipe, latch means on the blow head engageable with said blast pipe to suspend the latter in a raised, inactive position, and trip means engageable with the latch means during certain movement of the blow head along the ribbon for releasing the latch means, cam means cooperative with said cam roller controlling travel of said blast pipe to a lowermost active position interiorly of said article under control of the last-mentioned spring means for blowing air into the article while interiorly thereof, and another cam cooperative with said cam roller for raising the air blast pipe to a latched, inactive position.

2. In an apparatus according to claim 1, in which the trip means comprises means releasing the latch means and the blow pipe is lowered under control of the cam roller and spring means combined.

3. In an apparatus according to claim 1, wherein said latch means is a bell-crank lever pivotally mounted on said blow head, one arm of said lever normally cooperative with said single cam roller to suspend the blast pipe in the raised inactive position and the other arm of said lever disposed engageable with said trip means, said other arm being operative upon engagement with said trip means to turn the bell-crank lever to cause said one arm to be disengaged from said cam roller, allowing said blast pipe to move to the lowermost active position.

4. In an apparatus according to claim 3, including a rod extending from the air blast pipe, the blow head having a slot longitudinally thereof, said rod extending through and being slidable along said slot.

5. A blow head apparatus comprising a series of interconnected links; means for successively advancing the links; and an air tank; each of said links including a vertical cylindrical body integral with said link, a sleeve mounted in said body for vertical sliding reciprocating movement, resilient means urging said sleeve upwardly, a shoe secured on top of said sleeve and engageable with said air tank, an air blast pipe carried in said sleeve for vertical sliding reciprocating movement, resilient means urging said air blast pipe downwardly, said shoe, sleeve and blast pipe defining therethrough a vertically extending air blast passage communicating with said air tank, a cam roller, mounted on said blast pipe, latch means on said sleeve enagageable with said cam roller to normally suspend the blast pipe in a raised inactive position and operative to be disengaged from said cam roller to allow the blast pipe to move to a lowermost active position for blowing air, and means cooperative with said cam roller controlling downward movement when said latch means allows said downward movement.

6. A blow head apparatus according to claim 5 including a rod extending horizontally from the air blast pipe, said sleeve having a vertical slot, said rod extending through and being slidable along said vertical slot.

7. A blow head apparatus according to claim 6, wherein said latch means comprises a bell-crank lever pivotally mounted on said sleeve, one arm of said lever normally engaging said rod to releasably suspend the balst pipe in the raised inactive position and the other arm of said lever being disposed to be acted upon to turn the lever so as to disengage said one arm from said rod, means urging said lever resiliently to a position in which said one arm normally engages said rod.

8. A blow head apparatus comprising a series of interconnected links; means for successively advancing said links; an air tank; each of said links including a blow head body, an air blast pipe provided in said body and means supporting said blast pipe for vertical sliding reciprocating movement, resilient means urging said blast pipe downwardly, a shoe verticaly shiftable on said blow head body to a position for connecting said air tank and said blast pipe, resilient means urging said shoe upwardly, a single cam follower connected to said shoe and said blast pipe, and latch means on said blow head body to releasably suspend the blast pipe in a raised, inactive position; a first cam engageable with said cam follower, when said shoe is in a region forward of said air tank, for sequentially lowering and raising the shoe to first move the shoe below the tank level and then into engagement with said air tank; a second cam engageable with said latch means, when said shoe has been brought into engagement with said air tank for the air supply, for releasing the latch means to allow the air blast pipe to move toward a lowermost active position for blowing air into an article; a third cam disposed below said second cam and engageable with said cam follower to effect gradual downward movement of said blast pipe as the latter advances longitudinally; and a fourth cam engageable with said cam follower for returning the blast pipe to said raised inactive position.

9. In an apparatus for molding glass articles in part by gaseous pressure from a moving ribbon of plastic and thermally workable glass carried by an orifice plate link chain, the formed articles being suspended from the link chain at intervals therealong and in combination with said molding apparatus, a pressurizer means for effecting forced cooling of the formed articles and comprising an endless link-chain-connected series of blow heads operable to enter each article and blow air interiorly of the article in succession while travelling in synchronism with said ribbon, the improvement in said pressurizer comprising a cylinder in each of said blow heads, a piston reciprocable vertically within said cylinder, an air blast pipe integral with said piston for reciprocable vertical movement therewith and extending downwardly through said cylinder, resilient means urging said piston and blast pipe upwardly, an air tank for supplying air under pressure, a shoe vertically shiftable on each blow head, resilient means urging the shoe toward said air tank, a cam follower connected to said shoe, a cam engageable with said follower during certain movement of the blow head for sequentially lowering the blow head below the air tank and raising the shoe into engagement with said air tank, passage means to supply aid from said tank into the cylinder interior above said piston to move said piston and therefore said blast pipe to a lowermost active position interiorly of the formed articles individually, and air flow control means to allow air from said supply means to flow into the interior of said blast pipe for the blowing operation when said blast pipe has moved to said lowermost active position.

10. In an apparatus for molding glass articles in part by gaseous pressure from a moving ribbon of plastic and thermally workable glass carried by an orifice plate link chain, the formed articles being suspended from the link chain at intervals therealong and in combination with said molding apparatus, a pressurizer means for effecting forced cooling of the formed articles and comprising an endless link-chain-connected series of blow heads operable to enter each article and blow air interiorly of the article in succession while travelling in synchronism with said ribbon, the improvement in said pressurizer mean comprising a cylinder in each of said blow heads, a piston slidable vertically within said cylinder, and air blast pipe integral with said piston and downwardly extending through the interior of said cylinder, said piston having a transverse hole communicating with the interior of said blast pipe, resilient means urging said piston and blast pipe upwardly, an air tank for supplying air under pressure, said air tank having two longitudinal rows of air supply holes, the first row being located in advance of the first hole in the second row, each blow head having a shoe vertically shiftable on each respective blow head, resilient means urging the shoe toward said air tank, each shoe having a cam follower connected to said shoe, a cam engageable with said follower during certain travelling movement of the blow head for sequentially lowering and raising the respective shoe, said shoe having a first air inlet hole communicating with the interior space within the cylinder above said piston and a second air inlet hole communicating with the cylinder interior below said piston, said first and second air inlet holes cooperating with said first and second rows of holes when in registry therewith to be supplied with air through said first and second rows, respectively, whereby when the holes of said first row and said first inlet hole of said shoe are in registry the piston and therefore the blast pipe are moved to a lowermost active position interiorly of said article by the action of air introduced through said first inlet hole and then air is fed through said second inlet hole and said transverse hole, which are in registry with each other, into the interior of the blast pipe for blowing air into the article, means cooperative with said resilient means controlling travel of said pipe into the articles individually under control of said air.

11. In an apparatus according to claim 10 wherein said shoe is secured on the top of said cylinder and said resilient means for urging the shoe toward the air tank is a coil spring interposed engaging the cylinder and the blow head.

12. In an apparatus for molding glass articles in part by gaseous pressure from a moving ribbon of plastic and thermally workable glass carried by an orifice plate link chain, the formed articles being suspended from the link chain at intervals therealong and in combination with said molding apparatus, a pressurizer means for effecting forced cooling of the formed articles and comprising an endless link-chain-connected series of blow heads operable to enter each article and blow air interiorly of the articles in succession while moving synchronously with said ribbon, the improvement in said pressurizer comprising a cylinder in each blow head, a piston slidable vertically within said cylinder, an air blast pipe integral with said piston and downwardly extending through the interior of said cylinder, resilient means urging said piston and blast pipe upwardly, an air tank for supplying air under pressure, each blow head having a shoe vertically shiftable on each respective blow head, resilient means urging the shoe toward said air tank, each shoe having a cam follower connected to said shoe, a cam engageable with said follower during certain movement of the blow head for sequentially lowering and raising the respective shoe, passage means to supply air from said air tank into the cylinder interior above said piston to move said piston and therefore said blast pipe to lowermost active position interiorly of said article, means cooperative with said resilient means controlling travel of said pipe into the articles individually under control of said air, and throttled air passage means extending through said piston to connect said cylinder interior above said piston to the interior of said blast pipe to allow throttled flow of the air into said blast pipe for the blowing operation, with said blast pipe maintained at said lowermost action position.

13. In an apparatus according to claim 12, wherein said shoe is secured on the top of said cylinder and said resilient means for urging the shoe toward the air tank is a coil spring interposed between said cylinder and the body of said blow head.

References Cited
UNITED STATES PATENTS
2,184,900  12/1939  Snyder _____ 65—300

ARTHUR D. KELLOGG, Primary Examiner

U.S. Cl. X.R.
65—243, 264, 348